Aug. 23, 1966     H. D. PRUTTON     3,267,499
ARTICLE FORMING METHOD
Original Filed Oct. 4, 1961     13 Sheets-Sheet 3

INVENTOR.
HOWARD D. PRUTTON
BY
ATTORNEYS.

Aug. 23, 1966  H. D. PRUTTON  3,267,499
ARTICLE FORMING METHOD

Original Filed Oct. 4, 1961   13 Sheets-Sheet 6

INVENTOR.
HOWARD D. PRUTTON
BY
ATTORNEYS.

Aug. 23, 1966     H. D. PRUTTON     3,267,499
ARTICLE FORMING METHOD
Original Filed Oct. 4, 1961     13 Sheets-Sheet 7

INVENTOR.
HOWARD D. PRUTTON
BY
ATTORNEYS.

Aug. 23, 1966  H. D. PRUTTON  3,267,499
ARTICLE FORMING METHOD

Original Filed Oct. 4, 1961  13 Sheets-Sheet 11

Fig.17

INVENTOR.
HOWARD D. PRUTTON
BY
*Louis Grange*
ATTORNEYS.

Aug. 23, 1966  H. D. PRUTTON  3,267,499
ARTICLE FORMING METHOD
Original Filed Oct. 4, 1961  13 Sheets-Sheet 12

Fig. 18

INVENTOR.
HOWARD D. PRUTTON
BY
*Louise Granger*
ATTORNEYS.

FIG. 19

United States Patent Office 3,267,499
Patented August 23, 1966

3,267,499
ARTICLE FORMING METHOD
Howard D. Prutton, Cleveland, Ohio, assignor to Prutton Corporation, a corporation of Ohio
Original application Oct. 4, 1961, Ser. No. 142,967, now Patent No. 3,189,191, dated June 15, 1965. Divided and this application Mar. 19, 1965, Ser. No. 441,111
11 Claims. (Cl. 10—27)

This application is a division of my application Serial No. 142,967, filed October 4, 1961, entitled "Article Forming," now Patent No. 3,189,191 issued June 15, 1965.

This invention relates to article forming and has for its principal object the provision of improved methods and apparatus for working metal and other materials capable of being formed in dies and by punching or pressing.

An object of the invention is to increase production rates in article forming and to increase the speed with which slugs or blanks may be positioned for forming strokes in the case of relatively long pieces as well as unusually short ones.

A further object of the invention is to simplify the handling and movement of the blanks being worked upon and to enable simplified transfer mechanism to be employed.

Still another object of the invention is to enable the blank to be held relatively stationary while it is being engaged with the die, during the time it is gripped by the transfer mechanism and when it is being released.

Still another object of the invention is to retract the die from a relatively stationary work piece.

A further object is to form both sides or ends of a slug without the necessity for turning it over.

Still another object of the invention is to eject a work piece immediately after it has been formed.

Other and further objects, features and advantages of the invention will become apparent as the description proceeds.

In carrying out the invention in accordance with a preferred form thereof, a blank or piece to be worked upon is positioned and thereafter enveloped in a die while the piece remains substantially fixed in position. Simultaneously therewith the die and a punch or forming head are moved against the piece with sufficient pressure to form the piece. Then the die and punch are retracted while the piece is ejected from the die to maintain the piece substantially fixed in position.

Thereafter if more than one stroke is required for forming the piece it is transferred to a second working position by moving it along a substantially straight line transverse to the direction of movement of the die and punch to successive working positions bringing it intermittently to rest relative to any lateral movement of the die. Each time the piece is substantially stationary again, relative to lateral die movement, the piece is enveloped in a die and simultaneously therewith the die and a punch are moved longitudinally against the piece with sufficient pressure for further forming the piece. Thereafter each time the die and punch are retracted the piece is ejected from the die to maintain the piece substantially fixed in position until it is fully ejected and ready to be transferred to a further working position.

A better understanding of the invention will be afforded by the following detailed description considered in conjunction with the accompanying drawing, in which.

Like reference characters are utilized throughout the drawing to designate like parts.

An example of suitable apparatus that may be employed in carrying out the article forming methods of the invention is illustrated in FIGS. 1, 2 and 5 to 21 of the drawings, but it will be understood that the article forming invention is not limited to the use of the specific apparatus illustrated in these figures of the drawing.

Figure 3A:
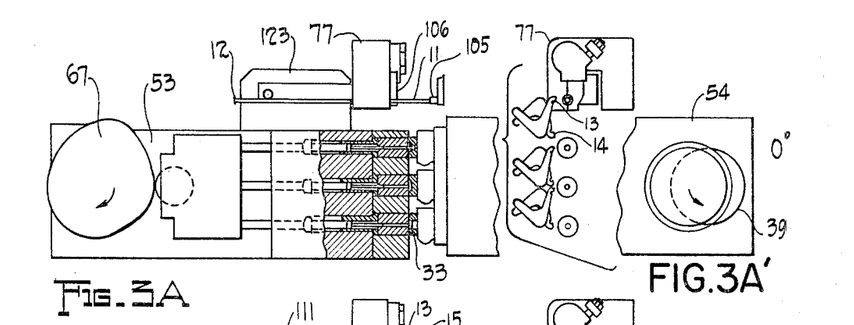
FIG. 3 is a sequence diagram showing successive positions of the rams, transfer fingers and work pieces in a cycle of operation, the different positions being represented in SUB-FIGS. 3a to 3f, inclusive.
Figures 3B, 3C:
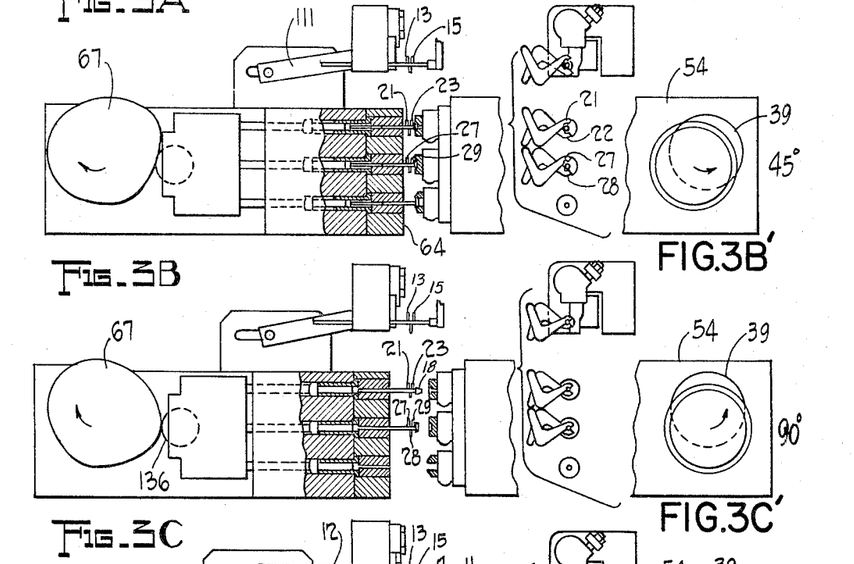
Figure 3D:
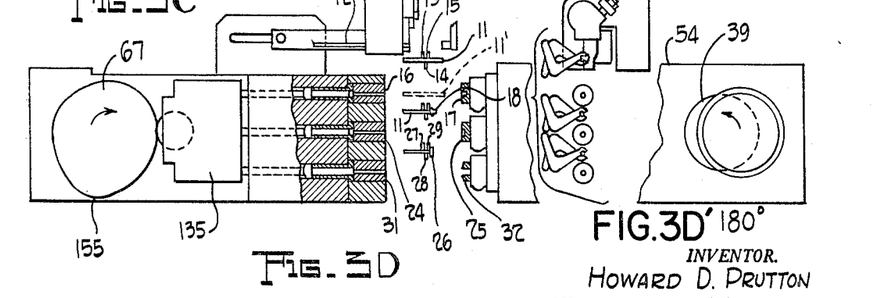

In carrying out the steps of the process for forming a headed member such as a bolt from wire stock, a length of wire is drawn out from a magazine parallel to the axis of the machine and cut-off to form a blank 11 indicated in FIG. 3d. Before the blank 11 is severed from the stock 12, it is grasped between a first set of fingers 13, 14 and 15 which may constitute the fingers of a transfer mechanism or the jaws of a manually held pair of pliers or the like and is retained substantially unchanged in location with respect to axial motion during the forming operation, but moved transversely in a substantially straight line to successively different stationary positions for carrying out the forming operations.

Figure 3E:
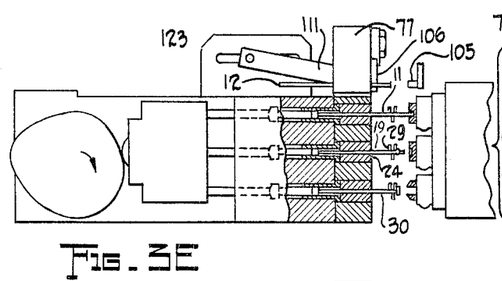

It is first brought to a stationary position indicated by dotted lines at 11' in FIG. 3d and simultaneously a die 16 and a punch or article forming tool 17 are moved towards each other to cause the die 16 to envelop the blank 11, causing the blank 11 to be supported in the die 16 and to be abutted by the forming tool 17 as shown at FIG. 3e.

Preferably the die 16 and the forming tool or punch 17 are caused to execute counter-rotary movement or to revolve in opposite directions in addition to reciprocating movement as will be described in greater detail hereinafter. In this case, the piece 11 is carried downward as the die 16 and tool 17 approach each other in accordance with the simultaneous downward translation of the members 16 and 17.

Figure 3F:
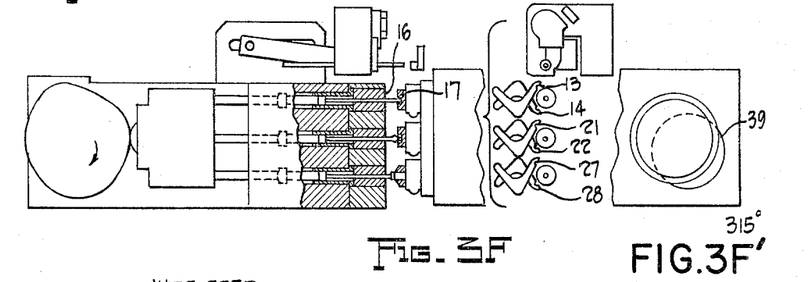

When the piece 11 has about reached the position shown in FIG. 3f the fingers 13, 14 and 15 are caused to start separating or opening while the forming members 16 and 17 are moved further toward each other to the position of FIG. 3a to carry out the first step in the forming process of the blank 11, which in the example illustrated constitutes forming a knob 18 thereon which occurs when the forming members 16 and 17 have reached the position shown in FIG. 3a.

The forming members 16 and 17 are then retracted in opposite directions and before the piece 11 has left the die 16 or while the piece 11 is still in the die 16 when the forming members 16 and 17 have separated sufficiently to permit regrasping the piece 11 it is again grasped. This may be done in the same manner as before if desired by the closing of grasping elements or fingers 21, 22 and 23 of the same type as the fingers 13, 14 and 15.

The piece 11 is then ejected from the die 16 at the same rate as the die 16 is retracted to the left so that the piece 11 does not move axially, although in the case of forming members 16 and 17 having the revolving motion previously alluded to, it is moved slightly transversely in accordance with the movement of the forming members 16 and 17. As the forming members 16 and 17 separate further, the piece 11 which is now carrying the knob 18 is moved onward transversely towards the next forming location represented at 19 in FIG. 3e.

If a transfer mechanism is employed, it will not be the fingers 13, 14 and 15 which grasp the piece 11 after the knob 18 has been formed thereon, but the second set of fingers 21, 22 and 23 in order to leave the fingers 13, 14 and 15 free for grasping and transferring a second blank from the cut-off position to the station of forming members 16 and 17, the fingers 21, 22 and 23 serving to transfer the blank 11 from the station of forming members 16 and 17 to the station of a second set of forming members including, for example, a die 24 and a punch or forming tool 25.

It is to be understood, however, that the invention is not limited to placing the die on one side and the punch or forming tool on the other side in successive stations as the positions may be alternated if desired according to the operations to be performed on the blank which is to be formed, thus avoiding the necessity for turning over the piece or the blank in moving to successive stations when the formation of the piece requires working upon opposite sides or ends thereof in succession.

It will be understood that there are one or more stations at which the article is subjected to forming operations according to the form that it is desired that the article take and the nature of the material, hardness, plasticity and so forth, which is being worked upon. By way of example the article forming method is described as carried out when it is worked upon in three successive stations. Thus, the second station is that of the die 24 and the punch or forming tool 25 which are designed for flattening the knob 18 to form a bolt head 26 on the piece 11.

The cycle of operations for a single revolution of the rams carrying the forming members is the same as before. In the next cycle of operations an additional blank is cut-off and carried through the movements described for the blank 11. The blank 11, however, now referred to as the blank in position 19 is enveloped in the die 24 as the forming members approach each other from the position shown in FIG. 3d to that shown in FIG. 3f whereupon the fingers 13, 14 and 15 and 21, 22 and 23 open and move out of the way to permit the forming members to approach each other to reach their final position shown in FIG. 3a at which the head 26 is completely formed.

As soon as the forming members have retracted the distance represented by FIG. 3b the pieces are again grasped. If a transfer mechanism is employed the fingers 13, 14 and 15 will have closed at about the position shown in FIG. 3b for grasping a third blank, the fingers 21, 22 and 23 will have reached the position shown in FIG. 3b for grasping the second blank and a third set of fingers 27, 28 and 29 are grasping the blank 11 in order to hold it in a fixed position with respect to longitudinal movement as it is simultaneously ejected from the die 24 as the die 24 recedes therefrom to enable the blank to be carried laterally as indicated in FIG. 3d to the station 30 of forming members 31 and 32 which may be a die 31 and a trimming tool 32 which completes the formation of the head 26 for a purpose, for example, of cutting off the corners to form a hexagonal head 33 as the members 31 and 32 travel successively through the positions represented by FIGS. 3d, 3e, 3f and back to the position of FIG. 3a.

Figure 1:
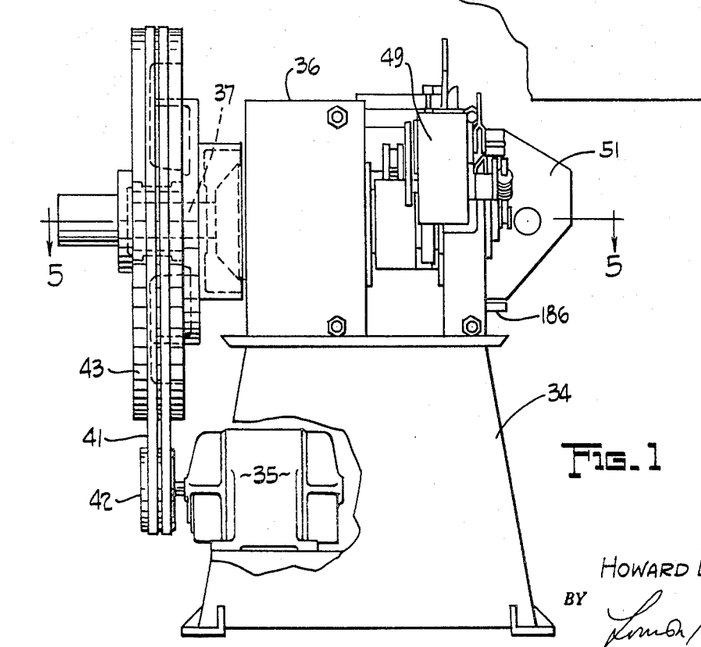
FIG. 1 is an end elevation of an embodiment of apparatus which may be employed in carrying out the invention.
Figure 2:
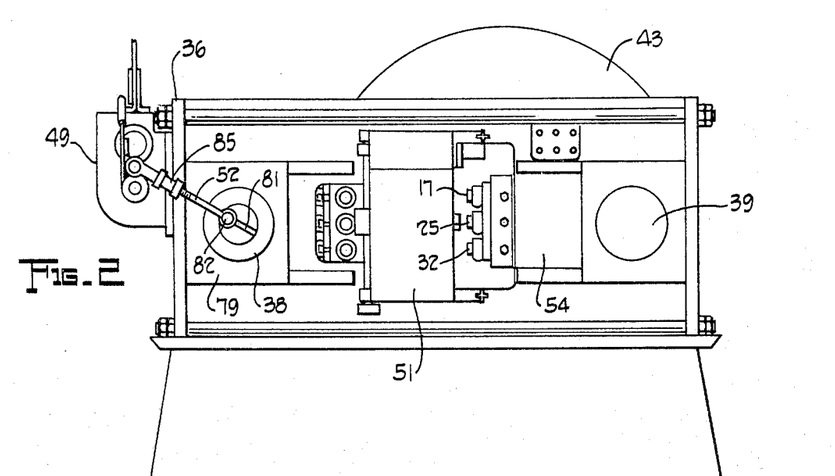
FIG. 2 is a side elevation of the apparatus of FIG. 1.
Figure 5:
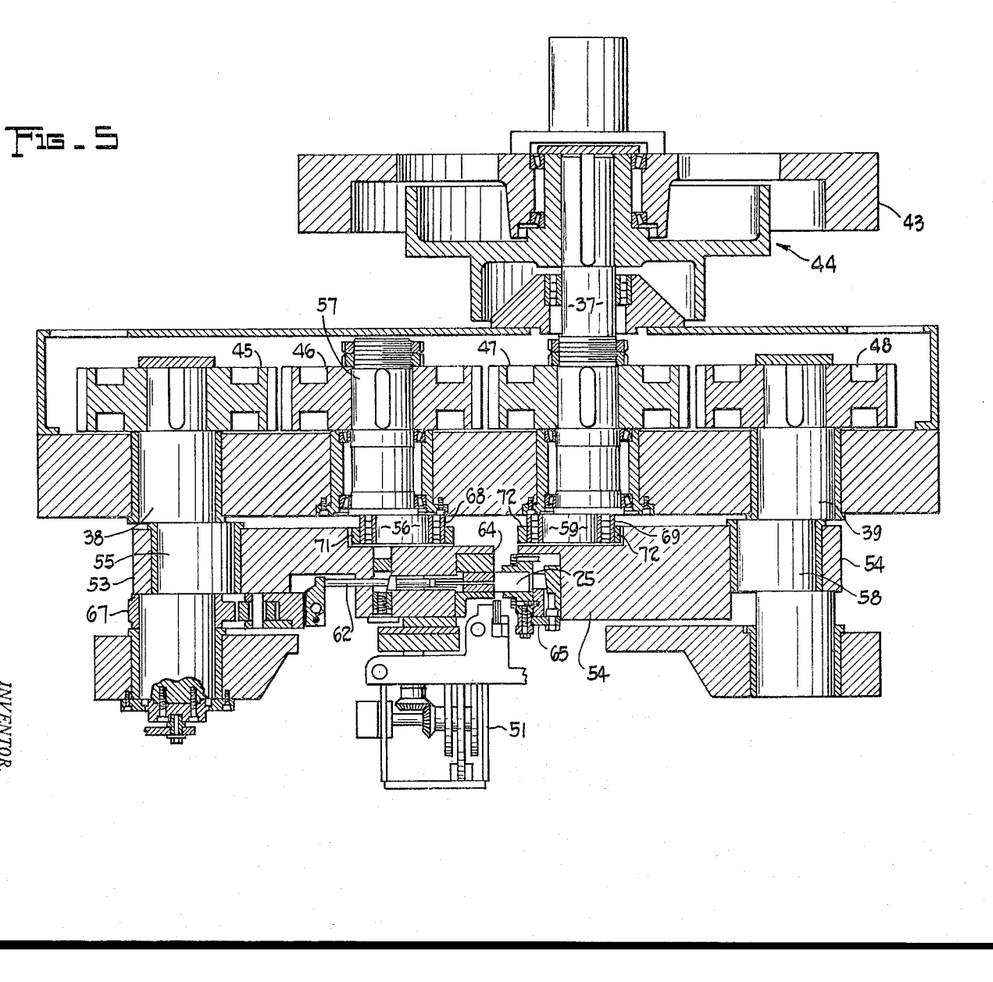
FIG. 5 is a view of a section of the apparatus of FIG. 1 represented as cut by a horizontal plane passing through the center lines of the drive shaft and the ram reciprocating shafts.

The form of apparatus shown by way of example in FIGS. 1 and 2 comprises a base 34 carrying a motor 35 and supporting a framework 36 for mounting the bearings for a main shaft 37, a die ram shaft 38 and a punch ram shaft 39 (shown in FIG. 5).

The main shaft 37 is connected to the motor 35 in a suitable manner as by means of V-belts 41 connecting a motor pulley 42 and a fly wheel pulley 43 on the shaft 37. Preferably for protecting the machine, a fawick clutch-brake combination represented generally by the reference numeral 44 is interposed between the fly wheel 43 and the shaft 37. The clutch-brake combination, however, not being a part of the present invention, but being conventional in form is not described herein. Suitable gearing, including gears 45, 46, 47 and 48, is provided for connecting the main shaft 37 to the ram drive shafts 38 and 39.

As indicated generally in FIGS. 1 and 2, various auxiliary mechanism is also mounted upon the base 34 or the framework 36 including a wire stock feed roll assembly 49 and a transfer mechanism 51, retractable as will be described more fully hereinafter for enabling the dies or ram tools to be interchanged or adjusted. As shown in FIG. 2, provision is made for driving the feed roll assembly 49 from the die ram crank shaft 38 by means of a connecting rod 52.

As shown more clearly in FIG. 5, there is a die ram 53 supported at both ends by eccentrics and a punch ram 54 likewise supported at both ends by eccentrics so that both rams remain horizontal at all times but execute rotary motion or such a motion that each part thereon revolves about some horizontal axis with the two rams revolving in opposite directions so that they simultaneously execute reciprocatory motion toward or away from each other and likewise up and down motion in unison. The die ram 53 is supported at one end by an eccentric 55 on the crank shaft 38 and at the opposite end it is guided by an eccentric 56 carried by a shaft 57 which in turn carries the gear 46 meshing with the drive gear 47 of the main shaft 37. Idler gears, not shown, are provided between gears 45 and 46, and between gears 47 and 48, to obtain revolving movement of the rams 53 and 54 with both rams remaining horizontal. The punch ram 54 is in like manner supported at the outer end by an eccentric 58 on the crank shaft 39. At the inner end the ram 54 is guided by an eccentric 59 on the main drive shaft 37.

Figure 14:
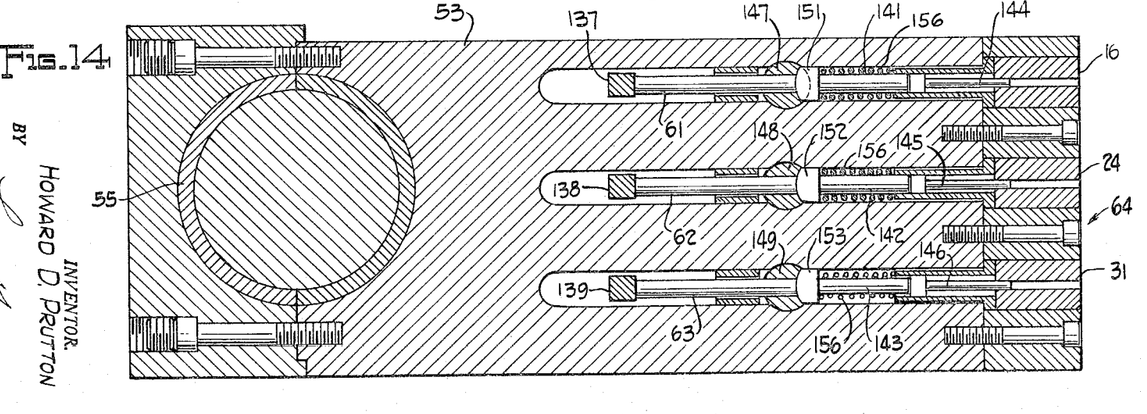
FIG. 14 is a view of a section of the die ram represented as cut by a vertical plane 14—14 indicated in FIG. 21.

The die ram 53 also carries an ejector mechanism including ejector push rods 61, 62 and 63 (FIG. 14). The ram 53 has a die face 64. The punch ram 54 carries suitable clamping mechanism 65 for mounting the forming tools, punches or the like 17, 25 and 32, which are shown in flat faced form for simplicity in FIGS. 2 and 5. For actuating the ejector mechanism including the ejector push rods 61, 62 and 63, a cam 67 is mounted on the die ram crank shaft 38.

In order that the alignment of the rams 53 and 54 may be adjusted and possible wear on the parts may be compensated so that the rams 53 and 54 will always remain horizontal, roller bearings 68 and 69 may be mounted on the rams 53 and 54, respectively, for receiving the eccentric journals 56 and 59, respectively, and provided with adjustable mounting blocks 71 and 72 fastened to rams 53 and 54, respectively, as shown in FIG. 5.

Figure 6:
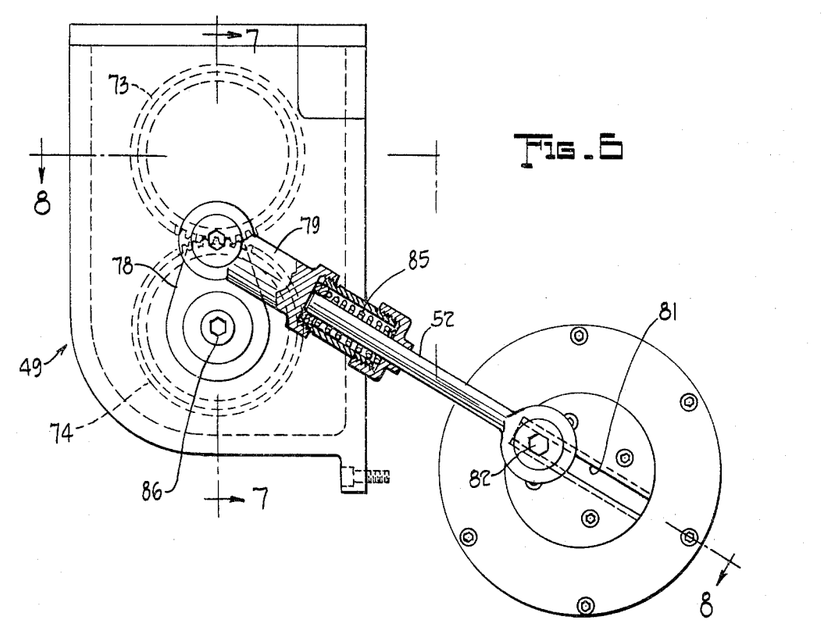
FIG. 6 is an elevation of the wire blank feed roll assembly.
Figures 7, 8:
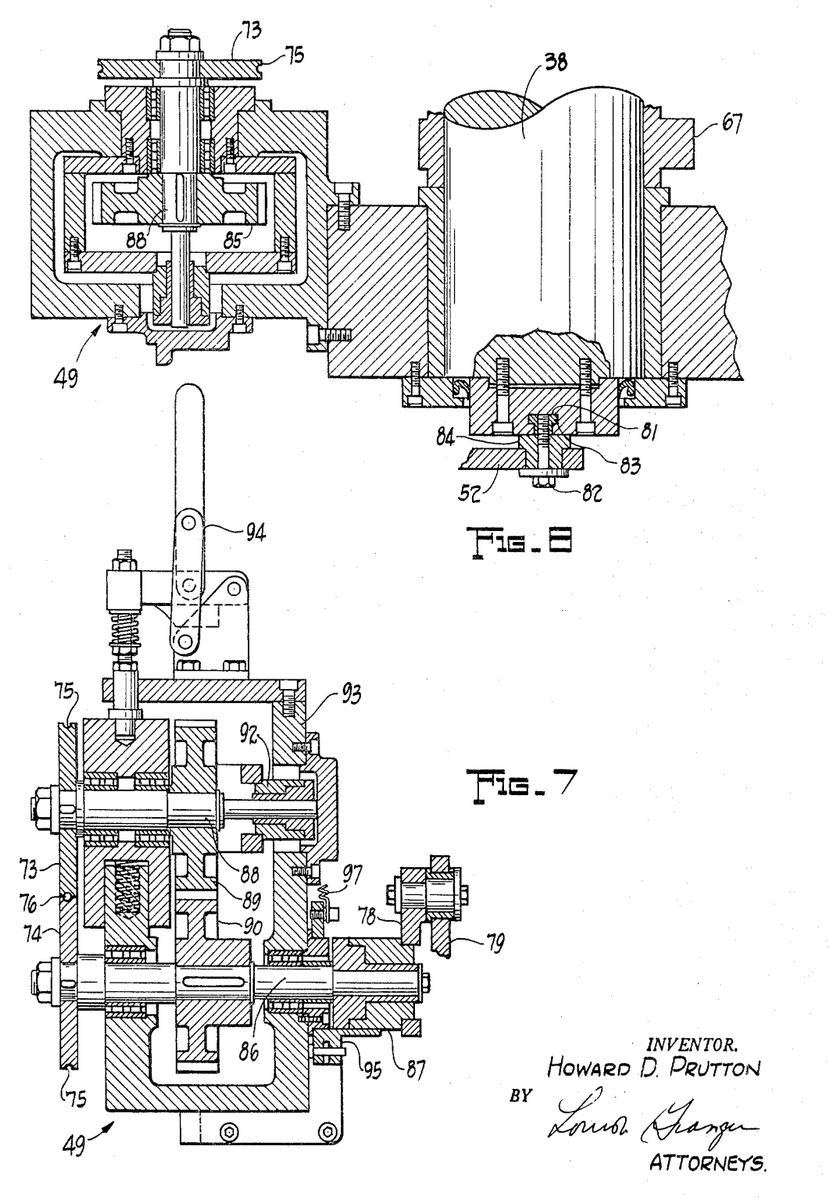
FIG. 7 is a view of a section of the feed roll assembly represented as cut by a vertical plane 7—7 indicated in FIG. 6.
FIG. 8 is a fragmentary view of a section of the feed roll assembly represented as cut by a broken plane 8—8 indicated in FIG. 6.
Figure 9:
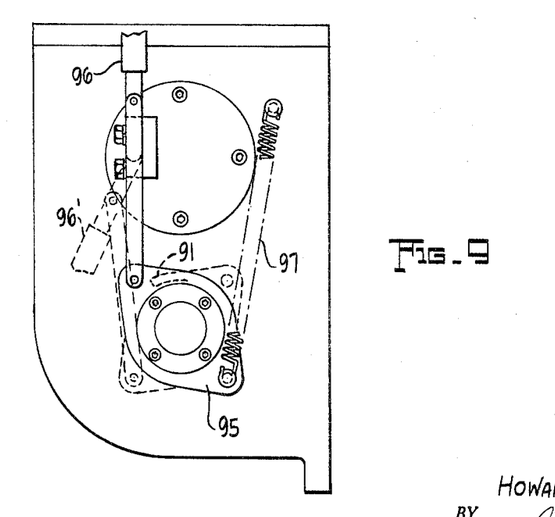
FIG. 9 is an elevation of a disengageable clutch assembly for engaging and disengaging the feed of the feed roll assembly.
Figure 10:
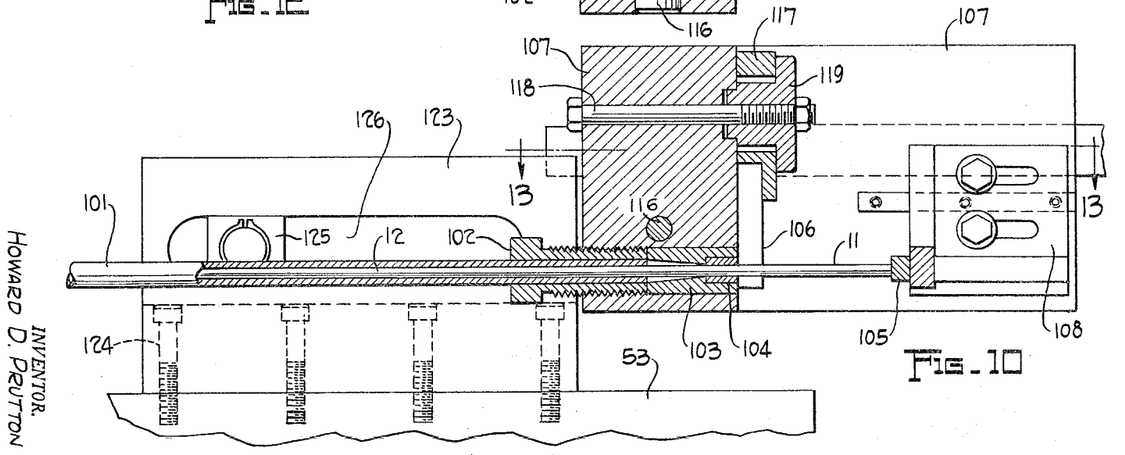
FIG. 10 is an elevation of the blank cut-off assembly partially in section represented as cut by a vertical plane 10—10 indicated in FIG. 11.
Figure 11:
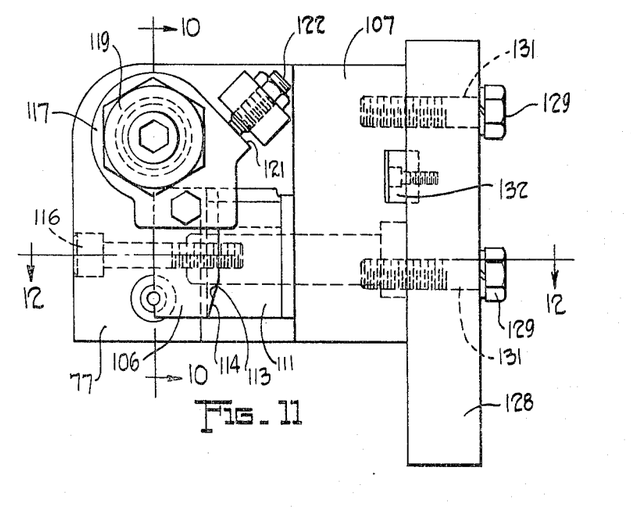
FIG. 11 is an end elevation of the cut-off assembly.
Figure 12:
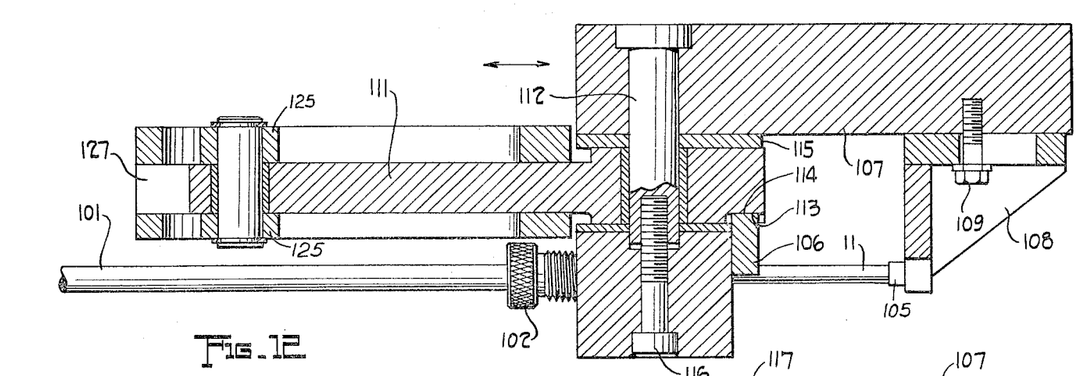
FIG. 12 is a view of a section of the cut-off assembly represented as cut by a horizontal plane 12—12 indicated in FIG. 11.

As shown in FIGS. 6 and 7, the feed roll assembly 49 comprises a pair of feed rolls 73 and 74 with grooves 75 in their peripheries for gripping wire stock 12 from a magazine (not shown) and feeding the wire stock 12 to a cut-off mechanism 77 (shown in FIGS. 3 and 11).

There is a drive for the feed rolls 73 and 74 comprising a ratchet crank 78 connected by a shank 79 of connecting rod 52 to the die ram driving crank shaft 38 adjustably by means of a T-slot 81 and bolt 82 engaging a shouldered nut 83 in the T-slot 81. The bolt 82 and nut 83 are so arranged that when the nut 82 is tightened it clamps the nut 83 in a predetermined position in the slot 81 and also secures a post 84 upon which the rod 52 is pivoted. A spring connection 85 may be included in the connecting rod 52 if desired.

The crank 78 is connected to the shaft 86 of the feed roll 74 by means of a one-way or back stopping clutch 87. The arrangement is such that the crank 78 engages the shaft 86 when the connecting rod 52 is drawn to the right but releases when the rod 52 is pushed to the left. The invention is not limited to the use of any particular ratchet mechanism or one-way clutch and the details of the one-way clutch 87 need therefore neither be illustrated nor described. Satisfactory results have been obtained, however, by the employment of a one-way Marquette type clutch described in the 1959 printed catalogue of Curtiss-Wright Corporation, Marquette Division, Cleveland, Ohio, entitled "Curtiss-Wright Clutches."

The feed roll 73 is mounted upon a shaft 88 connected to the shaft 86 by means of gears 89 and 90. Preferably a back stopping clutch 92 is mounted on the shaft 88 and secured to the feed roll assembly housing 93 for preventing backward rotation of the shaft 88 on the idle stroke of the crank 78. The back stopping clutch 92 may be a Marquette clutch of the same type as the clutch 87. A toggle clamp 94 is provided for releaseably clamping the feed roll 73 against the feed roll 74 upon the wire 76.

The clutch 87 is provided with an ear (not visible in FIG. 7) for engaging a pawl 91, on a member 95. A clutch control lever 96 is provided for retracting the pawl 91 on the member 95 beyond the normal stroke of the ear on the clutch 87 to permit the machine to function and the feed rolls to operate. The arrangement is such, however, that when the lever 96 is released to take the position represented by the dotted lines 96′, the pawl 91 engages the ear on the clutch 87 for applying enough pressure to the clutch 87 through a spring 97 to prevent the clutch 87 from operating. In this manner, the feed of the feed rolls can be engaged and disengaged. The force of the spring 97 is greater than the force required to retain the ear on the clutch 87 and therefore through the use of the spring 97 the clutch 87 can be disengaged in the back position of the stroke no matter what the adjustment is in the T-slot 81.

As illustrated in FIGS. 10, 11, 12 and 13, the cut-off mechanism 77 comprises a tube 101 through which the feed rolls 73 and 74 are adapted to push the wire stock 12, a screw 102 aligning the end of the tube 101, a cut-off quill 103 having a hardened bushing 104 therein, a feed stop 105 and a cut-off knife 106. The quill units 103 and 104 are mounted in an adjustable frame 107 and are adjustable in a line parallel to the axis or pressure application line of the machine. The feed stop 105 is adjustably mounted upon the frame 107 by means of a slotted base bracket 108 and machine screws 109. In this manner, the cut-off piece 11 can be approximately centralized with the transfer mechanism so that the transfer fingers 13, 14 and 15 can grasp the blank 11 in the center.

A rotary cam mechanism is provided for actuating the cutter knife 106. This comprises an arm 111 rotatable about a post 112, a cam surface 113 on the side of the arm 111 toward the end thereof and a mating cam surface 114 on the end or back edge of the knife 106. A thrust bearing 115 is preferably provided to take up the lateral thrust of the cam surfaces 113 and 114. The screw 102 serves for adjusting the clearance between the cut-off quill 103, 104 and the cut-off knife 106. The pivot post 112 upon which the arm 111 oscillates is put in such a position that the screw 116 and the head on the post 112 can be preloaded to handle the forces required to cut-off the wire 12.

The cut-off knife 106 is provided with a hub-portion 117 pivoted by a screw 118 and a flanged journal 119. A limit stop for the knife 106 is provided comprising a surface 121 co-operating with an adjustable screw 122. A spring (not shown) is preferably provided for holding the knife 106 down against the cam surface 114 and the limit stop screw 122.

The operation of the cut-off 77 is such that the center line of the wire 12 is approximately ⅛ of an inch below the center line of the transfer fingers 13, 14 and 15 and when the part is cut it is pushed up into the transfer fingers which are then adapted to transfer it into the machine.

For oscillating the cut-off arm 111, a slotted block 123 is provided which is secured to the die ram 53 by machine screws 124, which causes the block 123 to rotate with the die ram. The arm 111 is provided with blocks 125 adapted to slide in slots 126 formed in a channel shaped portion 127 of the member 123. Thus, the blocks 125 reciprocate as the die ram 53 revolves to communicate vertical oscillatory motion to the cut-off arm 111.

Longitudinal adjustment of the frame 107 of the cut-off assembly 77 upon the upright portion 128 of the machine framework 36 is provided by means of bolts 129 co-operating with horizontally elongated slots 131 in the upright 128. Preferably the frame 107 is notched at 132 to fit over ways 133 with end abutments 134 serving as limit stops for the adjustment of the frame 107.

Figure 15:
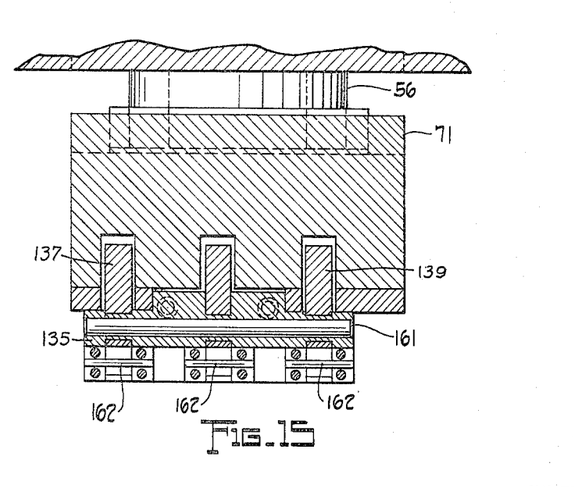
FIG. 15 is a view of a section of the ejector mechanism of FIGS. 5 and 21 represented as cut by a vertical plane 15—15 indicated in FIG. 21.
Figure 21:
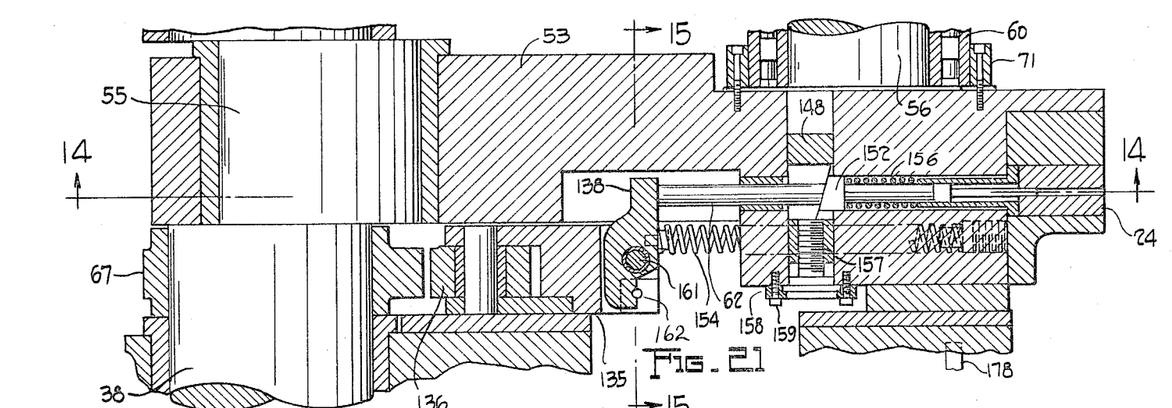
FIG. 21 is a view of a horizontal section through the die ram and blank ejector mechanism represented as cut by a horizontal plane through the shaft axes indicated by the plane 5—5 in FIG. 1, constituting an enlargement of a portion of the sectional view of FIG. 5.

FIGS. 14, 15 and 21 illustrate a sub-assembly of the die ram and ejector mechanism. The tools 16, 24 and 31 are shown as cylindrical pieces of steel with holes therein to conform to the work. The tools are shown as cylindrical for the sake of simplicity and may represent, for example, the tools for the forming of a common fastener. As already explained, the cut piece of wire which is to be formed is held in front of the die 16. Because of a rotary motion of the die ram 53 the die 16 envelops the cut piece 11 until the punch 17 begins to push it and then the fingers on the transfer mechanism open.

The ejector mechanism comprises a sliding member 135 carrying a cam follower 136 co-operating with the cam 67 on the die ram drive shaft 38 and a plurality of levers 137, 138 and 139, which co-operate with ejector rods 61, 62 and 63, respectively. Co-operating with the ejector rods 61, 62 and 63 are ejector pins 141, 142 and 143 which, in turn, co-operate with ejectors 144, 145 and 146, respectively.

For making minor adjustments in length of the working area of the dies 16, 24 and 31, wedges 147, 148 and 149 are provided which co-operate with bevel ended heads 151, 152 and 153 of the ejector pins 141, 142 and 143, respectively. Springs 154 are provided for keeping the ejector slide 135 against the cam 67. A bump 155 is formed on the cam 67 and the ejector pin 143 is made slightly longer, for example, 1/16 inch longer than the ejector pins 141 and 142 such that only the ejector pin 143 is actuated by the bump 155 on the cam 67. This is done for the purpose of giving a slight push in the final station to finish the shearing operation of the trim as close to bottom dead center as possible. Springs 156 surround the ejector pins 141, 142 and 143 to urge the heads 151, 152 and 153 into engagement with the wedges 147, 148 and 149.

For adjusting the wedges 148, locking screws 157 may be provided having locking members 158 secured by lock screws 159. A pivot rod 161 is provided for the levers 137, 138 and 139. Shear pins 162 are provided so that if an exceptionally heavy load is required to eject the work piece the shear pin 162 breaks and no damage is caused to the machine.

Figures 13, 16:
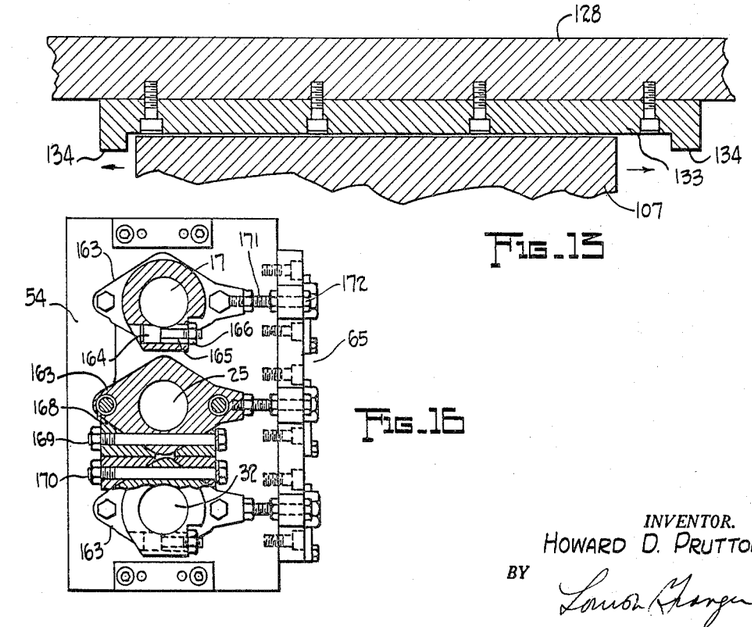
FIG. 13 is a fragmentary view of a section of the cut-off mechanism represented as cut by a horizontal plane 13—13 indicated in FIG. 10 and showing the ways for adjustment of the cut-off point.
FIG. 16 is an end elevation of the punch ram or forming ram as seen from the end carrying the forming tools.
Figure 17:
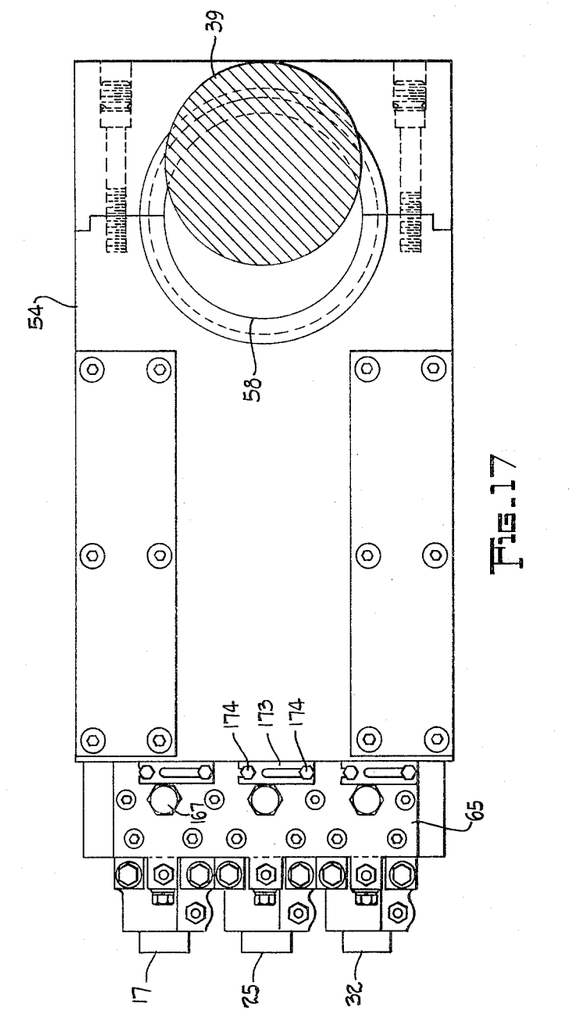
FIG. 17 is a side elevation of the punch ram or forming ram.

As shown in FIGS. 16 and 17, the punch ram 54 carries tools 17, 25 and 32 which are shown with flat faces for convenience, although these may take the form of dies or punches as desired. If one or more of the forming tools 17, 25 or 32 is in the form of a die for enveloping the work an ejector slide mechanism similar to that illustrated in FIGS. 14 and 21 will be provided. For example, in a nut former, in order to avoid reversing the part alternately to apply the work force to opposite sides or alternate sides, the tools will alternately be punches and dies. An ejector in the punch ram 54 then also serves the purpose of ejecting pieces from the punch to insure that they remain in the die ram for the timed ejection into the transfer fingers.

In the embodiment illustrated, the punches 17, 25 and 32 are held in punch blocks 163 and held in place by wedging clamping bolts 164, wedging sleeves 165 and nuts 166. For longitudinal adjustment suitable wedges are provided actuated by adjusting screws 167. For vertical positioning there are wedges 168, screws 169 and T-nuts 170. Horizontal alignment is provided by studs 171 and nuts 172. Locking plates 173 with fastening screws 174 serve for holding in place the screws 167 which effect the longitudinal wedge adjustment of forming tools 17, 25 and 32.

Figure 18:
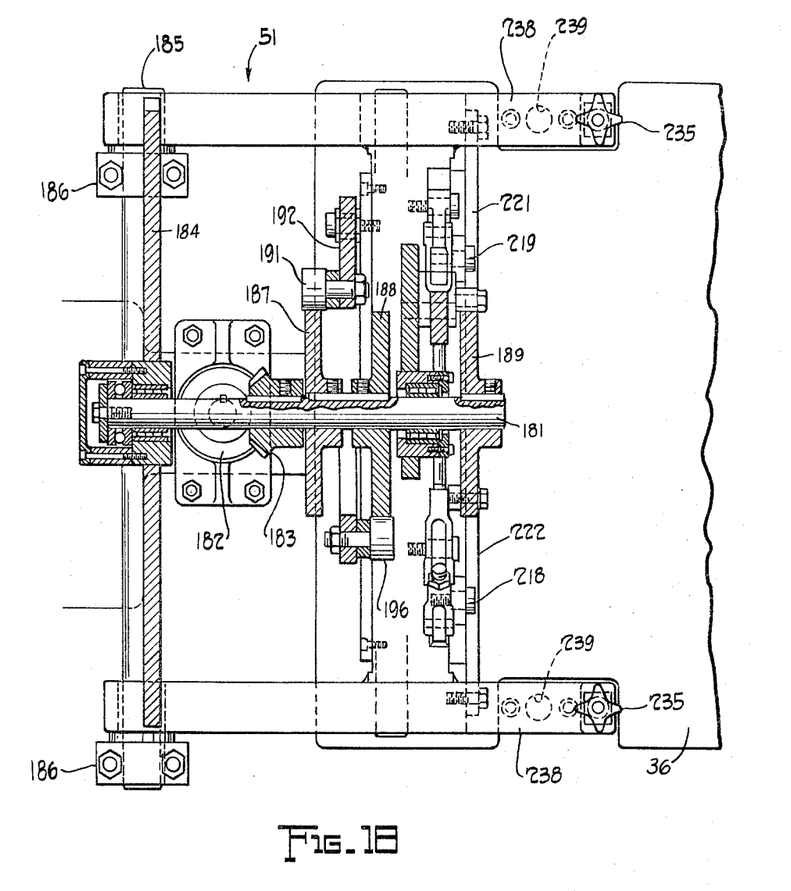
FIG. 18 is a view of a section of the transfer mechanism of the apparatus of FIG. 1 represented as cut by a vertical plane 18—18 indicated in FIG. 19.
Figure 19:
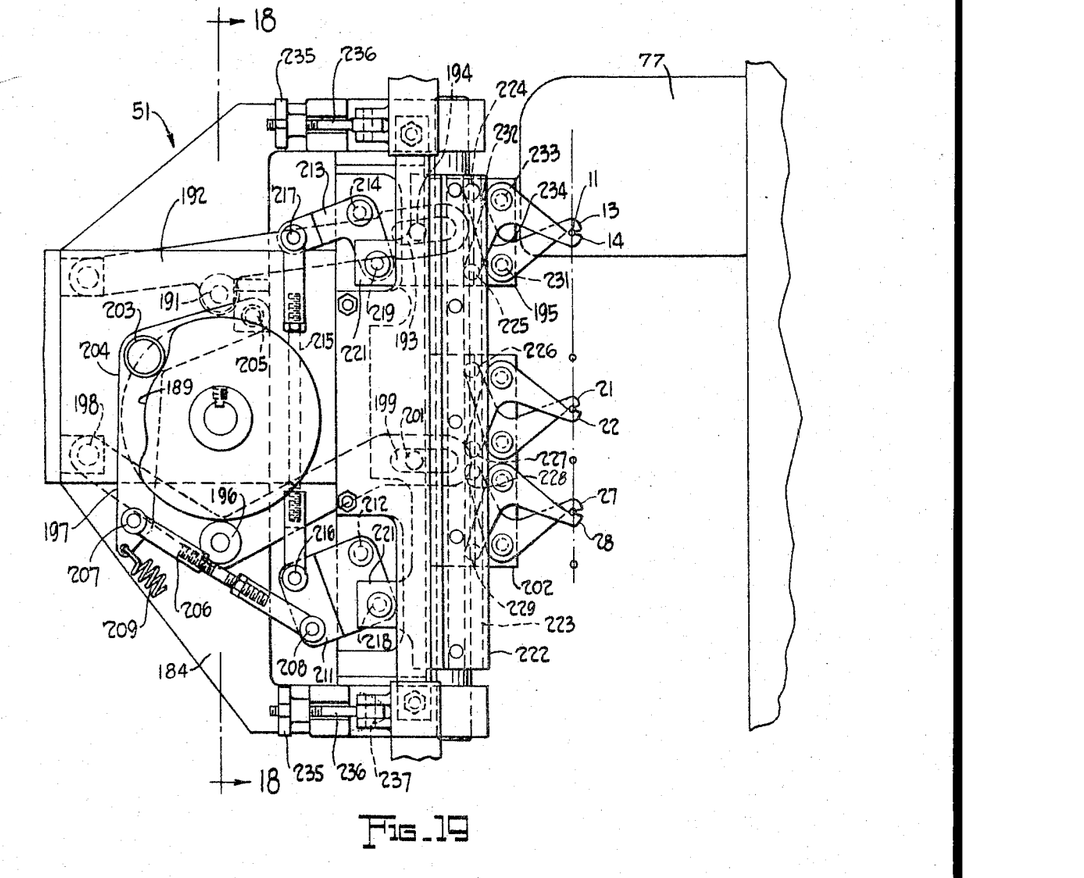
FIG. 19 is a side elevation, represented as seen from the front of the apparatus of FIG. 1, of the transfer mechanism.
Figure 20:
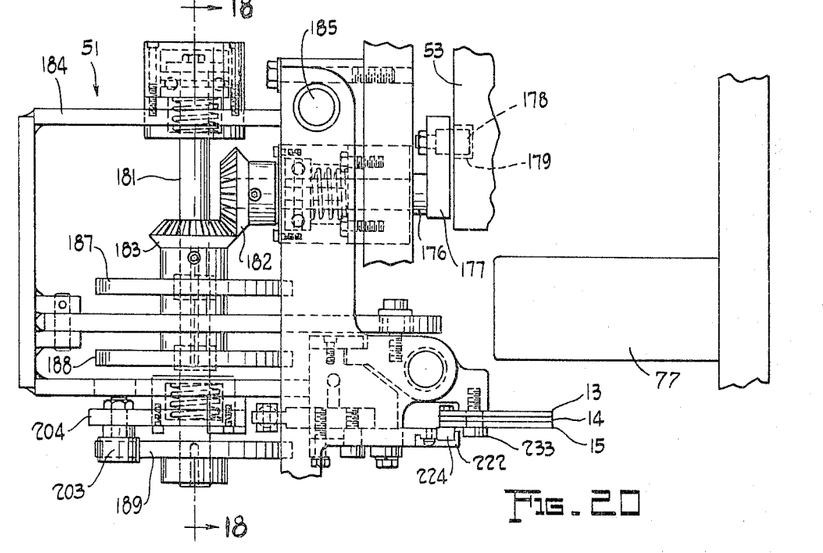
FIG. 20 is a top view of the transfer mechanism of FIGS. 18 and 19.

The transfer mechanism 51 shown in greater detail in FIGS. 18, 19 and 20 is provided with a drive shaft 176 connected to the die ram 53 by means of a crank 177 and a pin 178 fitting within a socket 179 in the die ram 53. The throw of the pin 178 is the same as that of the eccentrics 55 and 56 so that the motion of revolution of the die ram 53 is communicated to the transfer mechanism shaft 176. There is a cam shaft 181 connected to the drive shaft 176 by a pair of bevel gears 182 and 183.

The cam shaft 181 and associated parts driven thereby are carried in a framework 184 pivotally secured to the machine framework 36 by means of a vertical pintle 185 carried in brackets 186.

The cam shaft 181 carries three cams 187, 188 and 189. Co-operating with the cam 187 is a cam follower 191 on an arm 192 having a slot 193 at the end co-operating with a pin 194 carried by an upper slide 195. The slide 195 carries the first set of transfer fingers 13, 14 and 15 for carrying the blank 11 down to the first die 16. The fingers 13, 14 and 15 are mounted on the slide 195 separate from the other transfer fingers because of the longer distance of travel for this set of fingers to carry the piece 11 from the cut-off mechanism 77 to the first die 16.

Co-operating with the cam 188 is a cam follower 196 mounted on a bent arm 197 pivoted at one end receiving a pivot pin 198 and having a slot 199 at the opposite end co-operating with a pin 201 fixed in a lower slide 202. The lower slide 202 carries the remaining sets of transfer fingers, namely, the second set 21, 22 and 23 and the third set 27, 28 and 29. The peripheral shape of the cams 187 and 188 is such that the blank 11 is carried from the cut-off station 77 to the position of the first die 16 taking into consideration the circular motion of the die and punch rams, and that the blank ejected from the die 16 is carried from the station of the die 16 to the die 24 also taking into consideration the circular motion of the rams. Since the distance between the dies 24 and 31 is the same as that between the dies 16 and 24, the sets of fingers for accomplishing the transfer from one die to the next may be carried upon the same slide 202.

The third cam 189 is provided for opening and closing the fingers 13, 14, 15, 21, 22, 23, 27, 28 and 29. To this end a cam follower 203 is provided which co-operates with the cam 189 and is carried at the elbow of an elbow lever 204 pivoted at one end upon a pivot pin 205. Pivotally secured to the opposite end of the lever 204 is an adjustable link 206 having pivot pins 207 and 208 at opposite ends thereof. Preferably a biasing spring 209 is connected to the end of the lever 204 carrying the pivot pin 207 for holding the cam follower 203 against the periphery of the cam 189.

The pivot pin 208 in the link 206 is mounted in a swinging plate or bell crank block 211 pivotally secured to a stationary pivot pin 212. There is a corresponding bell crank 213 pivotally secured to a stationary pivot pin 214. Interconnecting the bell cranks 211 and 213 is an adjustable link or rod 215 having pivot pins 216 and 217 at the ends in the bell cranks 211 and 213, respectively.

Mounted in the bell cranks 211 and 213 are also pivot pins 218 and 219 secured in ears 221 of a plate 222 having a vertical groove 223 therein. The arrangement is such that as the cam 189 rotates causing the cam follower 203 to rise and fall the vertically grooved plate 222 moves to and fro primarily with a horizontal component of motion, moving to the left and to the right as seen in FIG. 19.

To co-operate with the vertical groove 223 in the horizontally moving plate 222 are cam followers 224, 225, 226, 227, 228 and 229, horizontal movement of which serves for opening and closing the fingers 13, 14, 15, 21, 22, 23, 27, 28 and 29. The vertical groove 223 may, if desired, be given a special shape for modifying the action of the fingers.

The transfer fingers are in the form of bell cranks. The pair of fingers 13 and 15 have a pivot 231 on the sliding plate 195 with a bell crank arm 232 carrying the cam follower 224, likewise the transfer finger 14 has a pivot 233 on the upper slide 195 with a bell crank arm 234 carrying the cam follower 225. The pivot fingers 21, 22, 23, 27, 28 and 29 are constructed in a similar manner but mounted upon the lower slide 202. Preferably the opening and closing of the transfer fingers is effected in timed relation to the circular motion of the rams 53 and 54.

The mounting of the entire transfer mechanism 51 upon the pintle 185 permits the transfer mechanism 51 to be swung out of the way when the tools 16, 24 and 31 and 17, 25 and 32 are to be worked upon or changed. When the transfer mechanism 51 is swung out, the bevel gears 182 and 183 separate to disengage the power from the transfer mechanism. The gears 182 and 183 are marked so that when the transfer mechanism 51 is re-engaged the sequence of operation is in the proper timing. Wing nuts 235 co-operating with swinging bolts 236 pivoted to the frame at the inner end are provided for securing the transfer mechanism 51 in operative position. In order to re-align the transfer mechanism in relation to the machine, very accurately tapered plugs 237 are secured to the swinging framework 238 of the transfer mechanism 51 adapted to mate with tapered seats 239.

Figure 4:
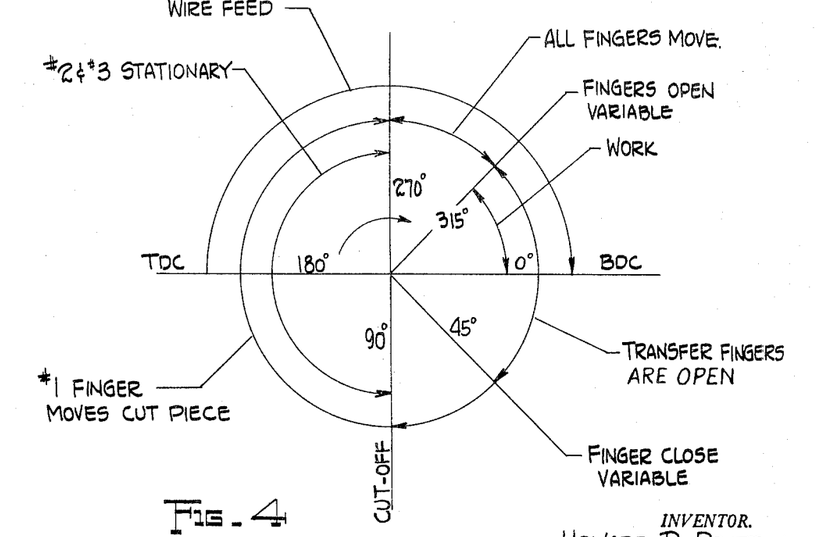
FIG. 4 is a circular sequence diagram illustrating the operations performed in relation to angular ram positions.

The sequence of operation is indicated in the diagrams of FIG. 3 and in FIG. 4. In FIG. 4 the clockwise movement of the die ram drive shaft or cam shaft 38 is represented, with zero degrees representing bottom dead center with rams 53 and 54 closed and 180 degrees representing top dead center with the rams opened. FIG. 3a represents the zero degree position, FIG. 3b the 45 degree position, FIG. 3c the 90 degree position, FIG. 3d the 180 degree position, FIG. 3e the 270 degree position and FIG. 3f the 315 degree position. During the first 45 degrees of rotation of the die ram cam shaft 38 and likewise of the driving pin 178 and the drive shaft 181 of the transfer mechanism 51, the transfer fingers are open. The opening action has begun at the 315 degree position of the previous stroke so that the transfer fingers are open and out of the way while the forming tools are close to each other.

The transfer fingers are caused to close at some point during the first 90 degrees, for example, at the 45 degree position so that the blank will be held by the transfer fingers when it has been cut-off and in like manner the blanks which have previously been worked upon will be held preparatory to transfer to the next station. At the 90 degree position cut-off of the stock 12 takes place to form the blank 11. From the 90 degree to the 270 degree point the fingers 13, 14 and 15 are moved from the cut-off mechanism 77 to alignment with the die 16 but the transfer fingers 21, 22, 23, 27, 28 and 29 remain stationary. From the 270 degree to the 315 degree position all the transfer fingers move and all open at about the 315 degree position. From the 315 degree to the 45 degree point all the transfer fingers again are open and work is done on the blanks between the 315 degree position and the bottom dead center or zero degree position.

The wire feed takes place during the 180 degrees of motion from top dead center to bottom dead center, that is, from 180 degrees position to zero or 360 degrees position. Cut-off of a new blank again takes place at the 90 degree position so that the operation is repeated, each blank being advanced one position for each rotation of the die ram drive shaft 38. The bump 55 on the ejector cam shaft 67 gives an extra push to the ejector pin 143 when the bump strikes the cam follower 136 at the 90 degree position so that the trim of the head 26 is completed and the finished piece may be discharged when the fingers again open.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. A method of working a piece which comprises the steps of positioning the piece for working thereon, enveloping it in a die while the piece remains substantially fixed in longitudinal position, simultaneously therewith moving said die and a punch longitudinally against the piece with sufficient pressure to form the piece and moving said die and punch transversely, retracting the die and punch while ejecting the piece from the die to maintain the piece substantially fixed in longitudinal position, transferring the piece to a second working position, again enveloping it in a die while the piece remains substantially fixed in longitudinal position, and simultaneously therewith moving both the die and the punch against the piece with sufficient pressure for further forming the piece.

2. A method of working blanks in successive operations which comprises the steps of positioning the blank, striking it from opposite longitudinal directions substantially simultaneously for partially forming the blank while moving the blank laterally, thereafter moving the blank laterally in substantially a straight line, striking the blank again from opposite longitudinal directions for further forming the blank while moving it laterally.

3. A method of working blanks which comprises the steps of positioning a blank at a point substantially in a line of motion, striking the blank from opposite directions along a curved path transverse to said line of motion and while moving said blank along said line of motion, transferring the blank along said line of motion and successively striking the blank from opposite directions along a curved path transverse to the line of motion, in each case maintaining the blank substantially at rest with respect to longitudinal motion while it is being struck, each successive transfer of the blank being substantially along the same straight line of motion.

4. A method of working a piece which comprises the steps of cutting off a piece of stock, transferring it laterally along a line to a working position, enveloping it in a die moving longitudinally and laterally along a curved path in a single plane, and simultaneously with motion along said line moving said die and a punch longitudinally against the piece transverse to said line with sufficient pressure to form the piece.

5. A method of working blanks which comprises the steps of positioning a blank to be worked upon, enveloping it in a die while the blank remains substantially fixed in longitudinal position and while moving along a line transverse thereto, and simultaneously with enveloping the blank in the die moving each said die and a punch along an arc of a circle in a single plane against the blank with sufficient pressure to form the blank.

6. A method of working blanks which comprises the steps of moving a blank to be worked upon along a line, enveloping it in a die moving longitudinally and transversely along a path in a single plane while the blank remains substantially fixed in longitudinal position transverse to said line and while moving along said line, and applying pressure to the piece from opposite longitudinal directions for forming it.

7. A method of forming blanks which comprises the steps of moving them linearly, intermittently bringing them to rest relative to pressure applying means and continuing to move them linearly, applying forming pressure from opposite sides along converging paths in a common plane to continue moving the blanks linearly and applying further forming pressure from opposite sides along converging paths in said plane to again move the blanks linearly.

8. A method of working a blank which comprises the steps of cutting off a piece of stock, transferring it along a line at a slow speed during envelopment thereof in a punch and die, and moving said punch and die together along converging arcs in a common plane perpendicular to said first line with sufficient pressure to form the piece while moving said piece along said first line at a higher rate of speed.

9. A method of working a piece which comprises the steps of transferring the piece along a line at a slow speed during envelopment thereof in a punch and die, moving said punch and die together along opposing arcs in a common plane containing said first line with sufficient pressure to form the piece while moving said piece along said first line at a higher rate of speed by the convergence of said arcs, and releasing the piece from envelopment in said punch and die while moving said piece along said first line at a slow speed by the divergence of said arcs.

10. A method of working a blank which comprises the steps of cutting off a piece of stock, transferring it along a line at a slow speed during envelopment thereof in a punch and die, moving said punch and die together along a second line perpendicular to said first line with sufficient pressure to form the piece while moving said piece along said first line at a higher rate of speed, moving the piece along said first line at a slow speed during release from said punch and die and transfer to a second punch and die, and moving said second punch and die together along a third line perpendicular to said first line with sufficient pressure to form the piece a second time while moving said piece along said first line at a higher rate of speed.

11. A method of working blanks which comprises the steps of positioning a blank to be worked upon, enveloping it in a die while the blank remains substantially fixed in longitudinal position and while moving along a line transverse thereto at a first speed, and simultaneously with enveloping the blank in the die longitudinally reciprocating said die and a punch against the blank with sufficient pressure to form the blank with movement of the blank along said transverse line at a second higher speed.

References Cited by the Examiner

UNITED STATES PATENTS

| | | | |
|---|---|---|---|
| 1,180,161 | 4/1916 | Link | 10—11 X |
| 2,052,760 | 9/1936 | Friedman | 10—12 X |
| 2,802,526 | 8/1957 | Hillman | 10—162 X |

ANDREW R. JUHASZ, *Primary Examiner.*